US009668545B2

(12) United States Patent
Jurkovic et al.

(10) Patent No.: US 9,668,545 B2
(45) Date of Patent: *Jun. 6, 2017

(54) CONDITIONALLY VISIBLE BITE LINES FOR FOOTWEAR

(71) Applicant: NIKE, Inc., Beaverton, OR (US)

(72) Inventors: Dragan Jurkovic, Taichung (TW); Chun-Wei Huang, Changhua (TW); Ming-Feng Jean, Yunlin County (TW); Chin-Yi Lin, Yunlin County (TW)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,399

(22) Filed: Jan. 5, 2016

(65) Prior Publication Data

US 2016/0128434 A1    May 12, 2016

Related U.S. Application Data

(63) Continuation of application No. 14/084,359, filed on Nov. 19, 2013, now Pat. No. 9,237,780.

(51) Int. Cl.
*G01J 5/02* (2006.01)
*A43D 8/26* (2006.01)
(Continued)

(52) U.S. Cl.
CPC .............. *A43D 8/26* (2013.01); *A43D 1/08* (2013.01); *A43D 8/00* (2013.01); *A43D 8/16* (2013.01);
(Continued)

(58) Field of Classification Search
CPC ........... G05B 2219/37048; G05B 2219/37208; G05B 2219/37266; G05B 2219/45243
See application file for complete search history.

(56) References Cited

U.S. PATENT DOCUMENTS 7,995,196 B1 * 8/2011 Fraser ................ G06K 9/00577
356/71
8,966,775 B2 * 3/2015 Regan ................... A43D 25/18
33/3 R
(Continued)

FOREIGN PATENT DOCUMENTS

DE          GB 1181632 A  *  2/1970  ............. A43D 25/07
DE          10343620 A1      4/2005
(Continued)

OTHER PUBLICATIONS

International Search Report and Written Opinion dated Apr. 13, 2015 for PCT Application No. PCT/US2014/066408, 9 pages.
(Continued)

*Primary Examiner* — Kiho Kim
(74) *Attorney, Agent, or Firm* — Shook, Hardy & Bacon L.L.P.

(57) ABSTRACT

A conditionally visible bite line may be demarcated on a shoe upper using at least one of a fluorescent or an Infrared (IR)-responsive material. Such a conditionally visible bite line may be observable only under particular conditions, such as when illuminated by an ultraviolet light source or an IR light source, as appropriate. A light may be projected to intersect the conditionally visible bite line under conditions rendering the conditionally visible bite line detectable. The intersection(s) of the projected light and the conditionally visible bite line may be used to create a virtual bite line for use in generating a tool path to process the surface of a shoe upper bounded by the conditionally visible bite line.

20 Claims, 9 Drawing Sheets

(51) Int. Cl.
*A43D 8/16* (2006.01)
*A43D 1/08* (2006.01)
*A43D 8/00* (2006.01)
*A43D 25/06* (2006.01)

(52) U.S. Cl.
CPC .... *A43D 25/06* (2013.01); *G05B 2219/37048* (2013.01); *G05B 2219/37208* (2013.01); *G05B 2219/37266* (2013.01); *G05B 2219/45243* (2013.01)

(56) References Cited

U.S. PATENT DOCUMENTS

| | | | |
|---|---|---|---|
| 2002/0023306 A1* | 2/2002 | Sajedi | A43D 1/04 12/133 R |
| 2010/0243030 A1 | 9/2010 | Yago | |
| 2013/0132038 A1* | 5/2013 | Regan | G06F 17/50 703/1 |

FOREIGN PATENT DOCUMENTS

| | | | | |
|---|---|---|---|---|
| EP | 0572123 | A2 | 12/1993 | |
| FR | 2911255 | A1 | 7/2008 | |
| GB | 699299 | A * | 11/1953 | ............. A43D 95/14 |
| GB | 2381331 | A | 4/2003 | |

OTHER PUBLICATIONS

International Preliminary Report on Patentability dated Jun. 2, 2016 for PCT Application No. PCT/US2014/066408, 3 pages.

\* cited by examiner

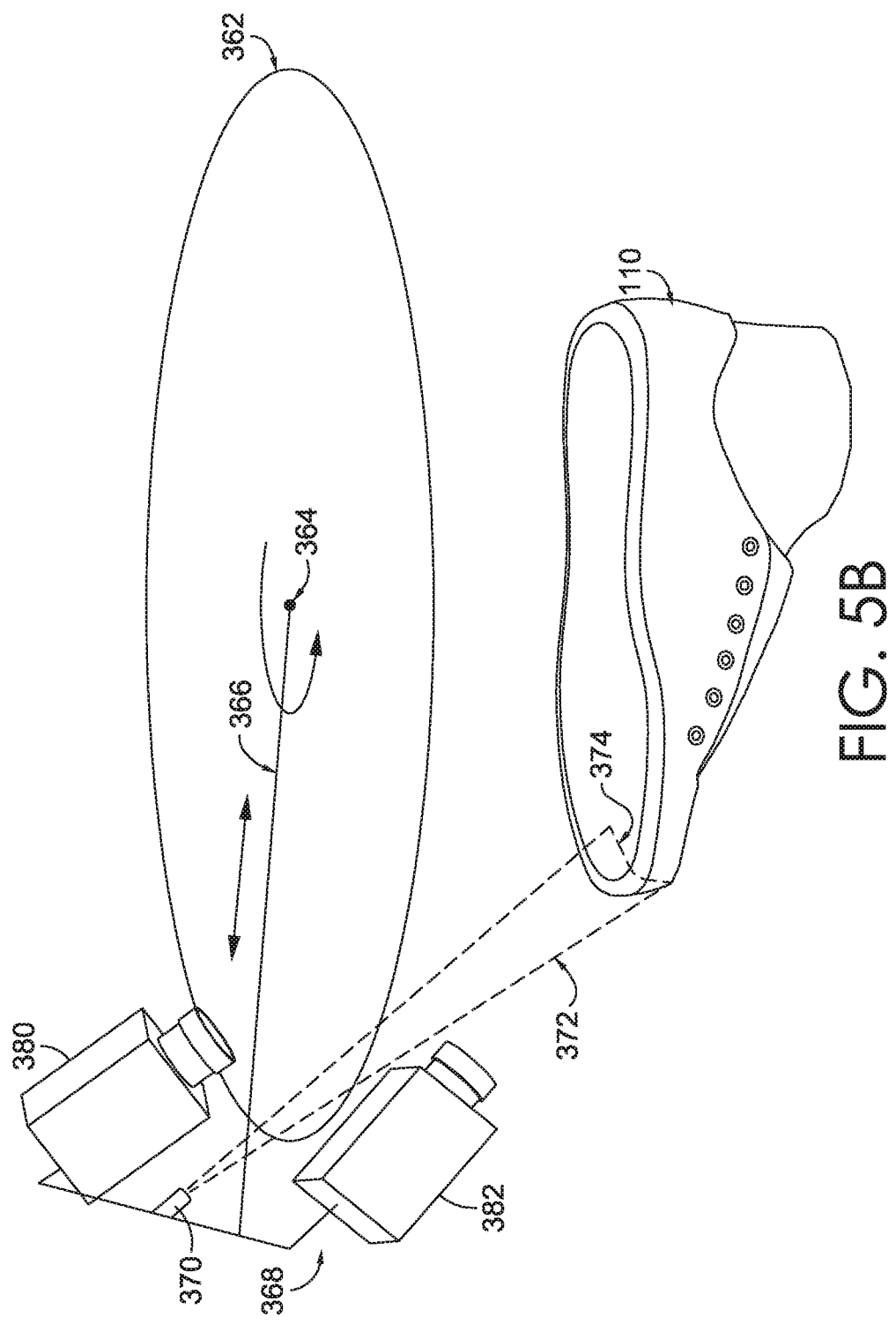

CONDITIONALLY VISIBLE BITE LINES FOR FOOTWEAR

CROSS-REFERENCE TO RELATED APPLICATIONS

This application is a Continuation of U.S. patent application Ser. No. 14/084,359, filed Nov. 19, 2013, and titled "CONDITIONALLY VISIBLE BITE LINES FOR FOOTWEAR". The above-referenced application is incorporated herein by reference in its entirety.

TECHNICAL FIELD

Aspects hereof relate to systems and methods for creating virtual bite lines in connection with articles of footwear, e.g., shoes. More particularly, aspects relate to systems and methods for marking a conditionally visible bite line at an interface between a shoe upper a shoe bottom unit, the conditionally visible bite line being detectable under predetermined lighting conditions, for use in the assembly of shoes.

BACKGROUND

Articles of footwear and, in particular, shoes may be made by combining components, such as uppers and bottom units, which may themselves be comprised of subcomponents. For instance, a shoe bottom unit may be comprised of a midsole and an outsole. Various techniques, such as the use of adhesives and/or cements, may be used to join one component, such as a shoe upper, to another component, such as a shoe bottom unit. The proper alignment of the various components of an article of footwear is critical in order for the article to function properly, to withstand use, and/or for the article to be aesthetically pleasing.

SUMMARY

Aspects hereof generally relate to shoes, especially athletic shoes, which may typically comprise an upper portion that at least partially encloses the foot of the wearer and a sole portion that protects the foot and contacts the ground, floor, or other surface upon which the wearer will stand, walk, run, etc. Uppers are often made of leather, fabric, textile sheets, other flexible sheet-like materials, or other types of material that may be curved and shaped in three dimensions and that are sufficiently pliable to receive human feet while providing a desired amount of durability, support, and protection to the wearer's foot. Soles often comprise at least two components, an outsole and a midsole. An outsole, if used, contacts the ground or other surface and, therefore, may provide any desired traction properties in sufficient resilience to last the intended lifespan of the shoe without degrading or wearing through due to friction during walking, running, etc. A midsole, if used, may provide cushioning to the wearer's foot, which may be particularly desirable for activities, such as many sports, that often involve a wearer's foot impacting the ground, floor, or other surface repeatedly and/or with great force. Even many non-athletes prefer to wear shoes that provide considerable cushioning from the combined midsole and outsole assemblies similar to those found in many sports shoes and may likewise prefer the support and/or protection often provided by a sports shoe upper.

As a result of the desires for protection and support from an upper, cushioning from a midsole, and traction and durability from an outsole, a given shoe may utilize diverse materials and structural designs for these different components. Further, additional components that provide, for example, particularized impact protection, motion control for pronation or supination, varying degrees of support, additional impact protection, and the like may further complicate the design of all or part of a shoe. Nevertheless, these components must be ultimately integrated to form a wearable shoe that is both functional and, ideally, attractive.

One approach to shoe component integration is to use one or more adhesives to affix an outsole and a midsole together and then to use different or similar adhesives to affix the sole assembly (often simply referred to as a "bottom unit" or "sole") to the upper. When using such an approach, however, care must be taken to provide sufficient adhesive coverage between the bottom unit and the upper in order to create an acceptably strong bond. However, care must also be taken to avoid over application of adhesives to regions of the shoe, particularly of the upper, that will be exposed after the shoe has been assembled. For example, the over-application of adhesives to a shoe upper beyond the portion of the upper to which the bottom unit is bonded upon assembly may lead to discoloration, unacceptable wear, the collection of dirt and other foreign materials, or other problems, in addition to being wasteful of adhesives. While meticulous and time-consuming handwork coupled with a high rejection rate during quality control processes may achieve shoes with uppers and bottom units well adhered to one another without over application of adhesives, such an approach generally is costly and wasteful. Further, the meticulous hand application of adhesives may often be guided by a bite line demarcation visibly placed upon a shoe upper to indicate the anticipated junction between the upper and the bottom unit after bonding. However, a bite line visible to a consumer after shoe construction has been completed will typically render the shoe unacceptable. Accordingly, yet more care must be taken to assure the proper alignment of a shoe upper and a shoe bottom unit to assure that all of the bite line formed on the upper is covered by the bottom unit. A visible bite line remaining on a shoe upper after assembly with a bottom unit may sometimes be removed by erasing or covered by the application of paints or dyes, but these additional manufacturing steps consume further resources. Even with careful control of processes around the assembly of shoe uppers to shoe bottom units, the use of a visible bite line on the shoe upper may be expected to require otherwise functional shoes to be rejected during quality control due to the presence of a visibly perceptible bite line.

Systems and methods in accordance herewith use a conditionally visible marking agent to mark a bite line upon a shoe upper indicating the junction between the shoe upper and the shoe bottom unit upon assembly and bonding, the conditionally visible bite line being visible only under certain conditions. Examples of conditionally visible bite lines include fluorescent bite lines and Infrared (IR) bite lines, each of which may be detectable, whether by a human eye or a camera, only under specific lighting conditions. For instance, specific lighting conditions rendering a fluorescent bite line detectable may comprise the use of an ultraviolet (UV) light source, often referred to as a black light, or a similar light source that permits the fluorescent bite line to be observed but that will not typically be present when shoes are worn and/or purchased. Specific lighting conditions rendering an IR bite line detectable may comprise the use of an IR light source or similar light source that permits the IR bite line to be observed but that will not typically be present when shoes are worn and/or purchased.

Conditionally visible bite lines may be applied to a shoe upper using a marking mechanism, for instance, while the shoe upper has been lasted and engaged with the bottom unit or a representation of the bottom unit. A conditionally visible bite line, such as may be created using a fluorescent marking agent or an IR marking agent, may denote the junction between the shoe upper and the bottom. A predetermined amount of force applied during this temporary engagement of a shoe upper to a shoe bottom unit or representation thereof may be the same or different than the amount of force to ultimately be applied to bond the shoe upper and the shoe bottom unit together using an adhesive.

While systems and methods in accordance herewith may advantageously permit a human operator to apply adhesives within the area defined by a conditionally visible bite line under lighting conditions permitting the human operator to perceive the conditionally visible bite line, systems and methods in accordance herewith may further facilitate the generation of an automated tool path to apply an adhesive or otherwise treat the surface bounded by the conditionally visible bite line. For example, a system including one or more cameras may be used to obtain images of a marked shoe upper under lighting conditions that render the conditionally visible bite line perceivable. For example, a black light emitting light in the Ultraviolet spectrum may be used to render a fluorescent bite line visible to at least one camera. A light source, such as a laser, may be projected across a portion of the marked shoe upper such that the light source intersects the conditionally visible bite line while the camera captures images of the shoe upper. The images captured by the camera may be analyzed to identify the points on the surface of the shoe upper where the reflected light from the light source crosses the conditionally visible bite line. The shoe upper and/or the light source may be moved to permit the cameras to capture a plurality of images that permit the identification of a plurality of points along the conditionally visible bite line where it is crossed by the projected light from the light source. These pluralities of locations may be used to define a virtual bite line. The resulting virtual bite line may thereafter be used to generate a tool path for the application of adhesives or other treatment of the surface of the shoe upper substantially within the area bounded by the bite line.

Systems and methods in accordance herewith may utilize one or more computing systems operating to execute computer software stored in a computer-readable media in the form of software code to control the operation of one or more components of the system and/or to execute one or more steps of methods in accordance with the present invention. Systems and methods in accordance herewith may store data, such as data describing a virtual bite line detected in conjunction with at least one camera, that may then be used to generate a tool path to control the physical movement and application of a tool to the surface bounded by the virtual bite line on the shoe upper.

Systems and methods in accordance herewith permitting the use of a conditionally visible bite line avoid the rejection of articles of footwear for quality control reasons due to a visible bite line on a finished shoe, while the creation of a virtual bite line permits the automation of the adhesive application process to attain a quality bond between the shoe upper and the shoe bottom unit without the overuse of adhesives or the risk of quality control rejections of finished shoes due to the over-application of adhesives.

BRIEF DESCRIPTION OF THE DRAWINGS

The present invention is described in detail herein with reference to the attached drawing figures, wherein:

FIG. 5B is a schematic diagram illustrating a side perspective of a lasted upper relative to an exemplary elliptical motion path of a light source and at least one camera, in accordance with aspects hereof;

DETAILED DESCRIPTION

Aspects hereof provide systems and methods for marking a bite line on a shoe upper for the guiding of future processing of the shoe upper. For example, a bite line created using systems and methods in accordance herewith may be used to guide the application of an adhesive to the shoe upper to ultimately bond the shoe upper to a bottom unit. Further, systems and methods in accordance herewith may be used to mark a virtual bite line used in the generation of a tool path for the application of an adhesive to the shoe upper or for other treatment of the surface of the shoe upper substantially within the area bounded by the bite line. Tool paths generated using a bite line in accordance with aspects hereof may comprise tool paths for buffing, cleaning, priming, painting, or otherwise processing surfaces bounded by the bite line in addition to the application of adhesives.

While the examples of shoe uppers and shoe bottom units are presented in a simplified fashion for exemplary purposes herein, in practice a shoe upper may comprise a large number of individual parts, often formed from different types of materials. The components of a shoe upper may be joined together using a variety of adhesives, stitches, and other types of joining components. A shoe bottom unit often may comprise a shoe sole assembly with multiple components. For example, a shoe bottom unit may comprise an outsole made of a relatively hard and durable material, such as rubber, that contacts the floor, ground, or other surface. A shoe bottom unit may further comprise a midsole formed from a material that provides cushioning and absorbs force during normal wear and/or athletic training or performance. Examples of materials often used in midsoles are, for example, ethylene vinyl acetate foams, polyurethane foams, and the like. Shoe bottom units may further have additional components, such as additional cushioning components (such as springs, airbags, and the like), functional components (such as motional control elements to address pronation or supination), protective elements (such as resilient plates to prevent damage to the foot from hazards on the ground or floor), and the like. While these and other components that may be present in a shoe upper and/or a shoe bottom unit are not specifically described in examples set forth herein, such components may be present in articles of footwear manufactured using systems and methods in accordance with aspects hereof.

Figure 1:
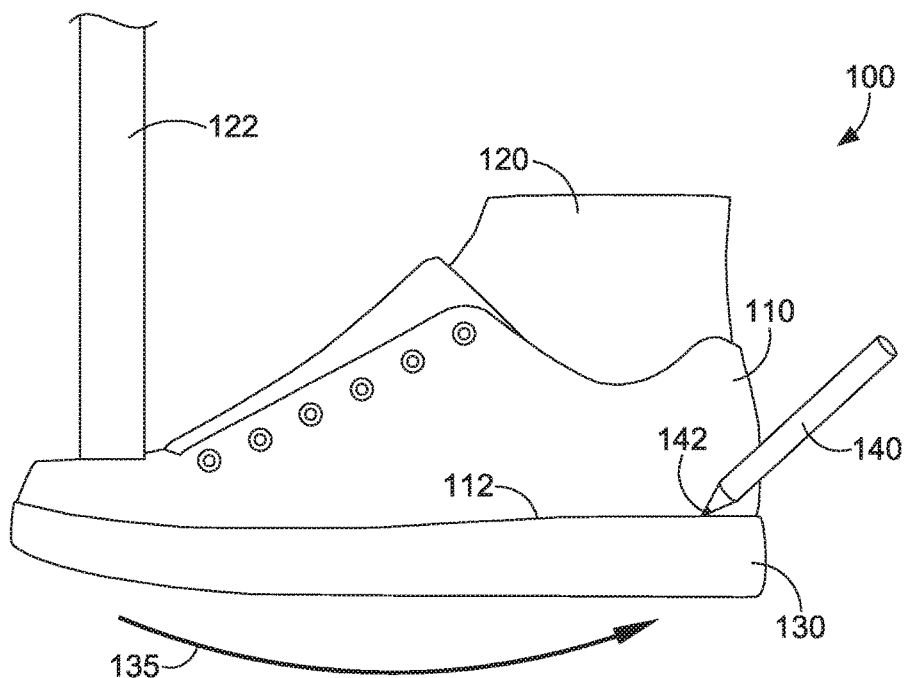
FIG. 1 is a schematic diagram illustrating an example of the marking of a conditionally visible bite line in accordance with an aspect hereof.

Referring now to FIG. 1, an exemplary system in accordance with aspects hereof is illustrated and designated generally as reference numeral 100. In the illustrated system 100, a shoe upper 110 has been placed on a last 120. The last 120 may apply a predetermined amount of force, optionally in conjunction with an additional member 122 to retain the lasted upper 110 against a corresponding bottom unit or a representation 130 of a corresponding bottom unit. It should be noted that, in processing, a representation 130 of a corresponding unit may be utilized rather than the bottom unit itself so that a single bottom unit representation 130 may be utilized to process a plurality of shoe uppers. A bottom unit representation 130 may emulate the actual materials, size, shape, contours, etc. of the corresponding bottom unit that will be applied to the shoe upper 110 upon assembly of the shoe. Further, it is contemplated that the bottom unit representation 130 may be formed from a material different from that which is typically used for the bottom unit. For example, a more durable and rigid material may form at least a portion of the bottom unit representation 130 as the function of the bottom unit representation 130 is to provide a guide for applying a bite line marking in a repeated production process. This is in contrast to a functional purpose of the actual bottom unit, which is generally provided for impact attenuation, support, and traction, among other reasons.

In the example illustrated in FIG. 1, the bottom unit representation 130 and the lasted upper 110 may be rotated as indicated by arrow 135 while contacted by a marking mechanism 140 having a marking tip 142 at a junction 112 between the lasted upper 110 and the bottom unit representation 130. In the illustrated example, the marking mechanism 140 may comprise a marking mechanism that utilizes a conditionally visible marking agent applicable via the marking tip 142 to apply conditionally visible indicia on the lasted upper 110 at the junction between lasted upper 110 and bottom unit representation 130. More particularly, the marking mechanism 140 may comprise a marking mechanism with one of a fluorescent marking tip and an IR marking tip that applies fluorescent indicia or IR indicia, respectively, at the junction 112 between the lasted upper 110 and the bottom unit representation 130 to create a conditionally visible bite line observable only under lighting conditions permitting the conditionally visible indicia to be detected. It is contemplated that the marking mechanism 140 may be maneuvered relative to the lasted upper 110 by a human (e.g., such as a human marking with a pen-like device).

Because the lasted upper 110 and/or corresponding bottom unit representation 130 may often be formed from pliable and/or compressible materials, the location of a bite line on the surface of the lasted upper 110 may vary based upon the amount of force or pressure used to mate the lasted upper 110 with the corresponding bottom unit representation 130. The predetermined amount of force applied by the system 100 during the marking of a conditionally visible bite line using the marking mechanism 140 may be the same force applied when ultimately bonding the lasted upper 110 to the bottom unit represented by the bottom unit representation 130, but may be different than the force applied during bonding without departing from the scope hereof. For example, if the bottom unit representation 130 is formed from a material different than the intended bottom unit, the amount of force to be applied may be adjusted to compensate for a different amount of compressibility between the materials. Further, it is contemplated that the size of the bottom unit representation 130 may actually be varied from that of the bottom unit to be applied as the size may compensate for variances in compressibility, deformability, or even the thickness of the tip 142.

Figure 2:
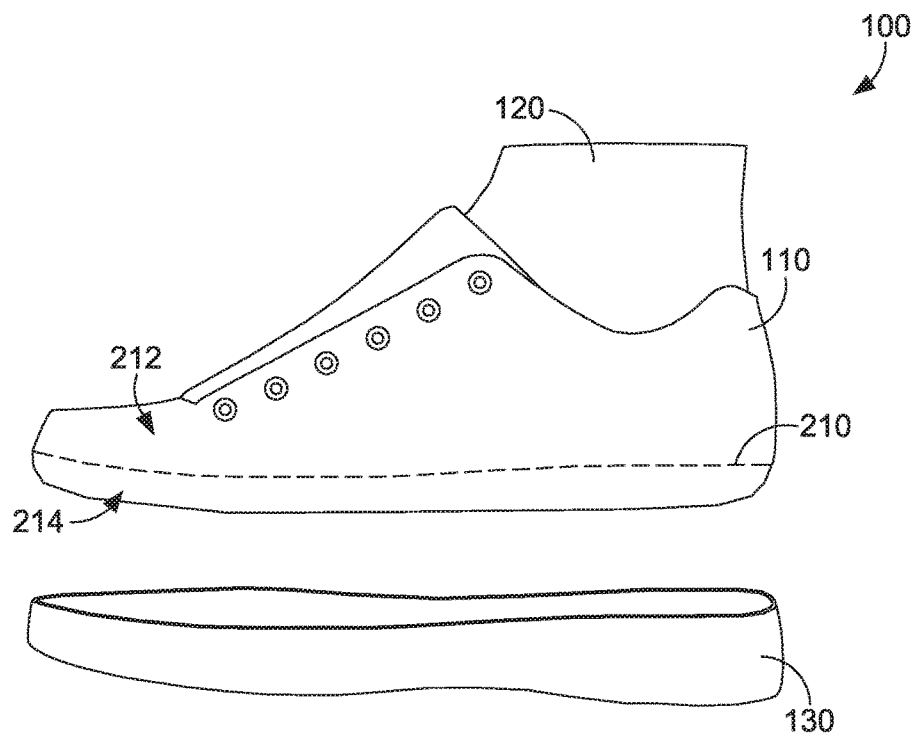
FIG. 2 is schematic diagram illustrating an example of a conditionally visible bite line marked in accordance with an aspect hereof.

Referring now to FIG. 2, the lasted upper 110 has been removed from the corresponding bottom unit representation 130. As shown in FIG. 2, a conditionally visible bite line 210 has been marked on the lasted upper 110. The conditionally visible bite line 210 may not be perceivable during all lighting conditions, the lighting conditions under which the conditionally visible bite line 210 is perceivable depending upon the marking agent used to mark the bite line 210. For example, the conditionally visible bite line 210 may only be visible when illuminated by a UV light source (e.g., a black light), an IR light source, or another lighting source that causes the marking agent used to apply the indicia of the conditionally visible bite line 210 to be detectable. In one example, the conditionally visible bite line 210 may comprise an indicia formed from a fluorescent marking agent (e.g., ink) such that the conditionally visible bite line 210 may be perceived when illuminated using a black light. In another example, the conditionally visible bite line 210 may comprise an indicia formed from an IR marking agent such that the conditionally visible bite line 210 may be perceived when illuminated using an IR light source. Any and all such variations, and any combination thereof, are contemplated to be within the scope of aspects hereof.

Still referring to FIG. 2, the conditionally visible bite line 210 defines a first area 214 and a second area 212 on the surface of the lasted shoe upper 110. The first area 214 corresponds to the portion of the surface of the lasted upper 110 that was covered by the bottom unit representation 130 when the lasted upper 110 was retained against the corresponding bottom unit representation 130 with a predetermined amount of force. Meanwhile, the second area 212 corresponds to the portion of the surface of the lasted upper 110 that was not covered by the corresponding bottom unit representation 130 when the lasted upper 110 was pressed against the corresponding bottom unit representation 130 with the predetermined amount of force. Accordingly, any processing intended to bond the bottom unit represented by the bottom unit representation 130 to the lasted upper 110 should be performed within the first area 214 bounded by the conditionally visible bite line 210. Further, any processing that may change the appearance of the surface of the lasted upper 110 that is performed in the second area 212 may result in changes observable in the finished shoe, while processing performed within the first area 214 may not be ultimately observable after the shoe has been assembled by bonding the lasted upper 110 to the corresponding bottom unit represented by the bottom unit representation 130.

The example of FIG. 2 illustrates only one example of the location of a conditionally visible bite line 210 on the surface of a shoe upper 110. The orientation, position, and configuration of a conditionally visible bite line in accordance with the present invention may vary greatly from that shown in the example of FIG. 2. For some shoe designs, the bottom unit represented by the bottom unit representation 130 may mate with the upper 110 in a fashion that extends the bottom unit 130 over a greater portion of the upper 110, resulting in a conditionally visible bite line 210 located further from the bottom of the upper 110 (e.g., closer to a forefoot opening and/or an ankle opening). For other shoe designs, the entirety of the bottom unit represented by the bottom unit representation 130 may be largely or entirely below the upper 110, resulting in a conditionally visible bite line 210 that is entirely or largely on the bottom surface of the upper 110 (e.g., proximate a strobel board in a strobel construction technique). In other examples, the extent to which a bottom unit represented by the bottom unit representation 130 extends up an upper 110 when mated may vary along the junction of the upper 110 and bottom unit representation 130, resulting in a conditionally visible bite line 210 that is not parallel with the bottom of the upper 110. Further it is contemplated that the conditionally visible bite line 210 may extend farther from the bottom unit in certain areas, such as a toe region and/or a heel region. In this example, the bottom unit may cover a greater portion of the upper 110 in these areas to provide structural benefits, such as abrasion resistance or improved ground-contacting surface (e.g., traction).

The shape of the upper 110 at the junction between the upper 110 and the bottom unit representation 130 may also vary from that shown in the example of FIG. 2, meaning that the conditionally visible bite line 210 may be created on a portion of the shoe upper 110 that is flat, convex, concave, or possessing a complex three dimensional curvature. Systems and methods in accordance herewith may provide and utilize conditionally visible bite lines in all of these and other configurations of a shoe upper and/or bottom unit.

Figure 3A:
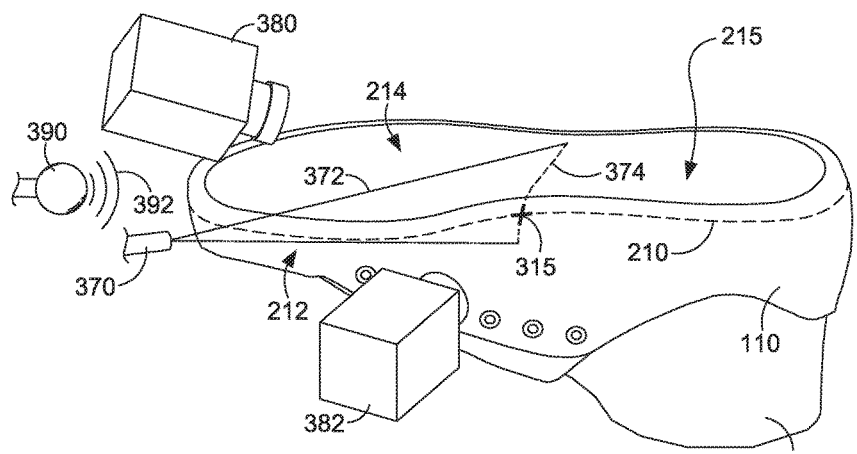
FIG. 3A is a schematic diagram illustrating the creation of a virtual bite line in association with a ultraviolet conditionally visible demarcation in accordance with an aspect hereof.

Referring now to FIG. 3A, a schematic diagram is shown illustrating the creation of a virtual bite line for an article of footwear having a conditionally visible bite line marked thereon in accordance with an aspect hereof. A first light source 370 (e.g., a laser) projects light 372 such that a portion 374 of the light 372 projects across at least a portion of the surface of the marked lasted upper 110. More particularly, at least a portion 374 of light 372 from the light source 370 may reflect from at least a portion of the first area 214 of the surface of the marked lasted upper 110. The light source 370 may be any suitable light source that provides a defined geometrical representation at a distance from the upper 110. For example, a slit lamp that produces a focused slit-like beam of light from an otherwise unstructured light source may produce the projected light needed to specifically identify an intersection between the light and the conditionally visible bite line 210. Another light source option includes a structured laser light source. A structured laser light source is a laser that projects a laser light in a structured light pattern, such as a line. This structured line of light may be formed by allowing light in a specific plane to fan outwardly from the source while constraining the dispersion of light in all other directions to result in a plane of light emanating from the structured laser source. When the plane of light contacts a surface, a laser line representation is formed having a focused nature and a controlled width perpendicular to the plane the light forms.

In aspects hereof, the wavelength of the light 372 emitted from the light source 370 renders the conditionally visible bite line 210 detectable. For instance, if the conditionally visible bite line 210 is marked utilizing an IR marking agent and the light source 370 is an IR light source emitting light 372 in the IR spectrum, the light 372 from the light source 370 will render the conditionally visible bite line 210 detectable at the intersection(s) of the light 372 and the bite line 210, obviating the need for any additional source of light, as also illustrated hereinafter in FIG. 3B. In other aspects, however, the wavelength of the light 372 emitted from the light source 370 does not render the conditionally visible bite line 210 detectable. For instance, if the conditionally visible bite line 210 is marked utilizing a fluorescent marking agent and the light 372 emitted from the light source 370 is not in the UV spectrum, the conditionally visible bite line 210 will not be detectable. In such aspects, an additional lighting source is needed to render the conditionally visible bite line 210 detectable, as depicted in FIG. 3A. Accordingly, FIG. 3A illustrates an optional light source 390, such as a UV lamp. It is contemplated that any number of optional light sources 390 may be implemented that provide any wavelength of light. As illustrated, at least one light source 390 emitting light 392 at a wavelength that will render the conditionally visible bite line 210 detectable is shown in an activated state.

While the light 372 from the light source 370 is projected across at least a portion of the lasted upper 110 to intersect with the conditionally visible bite line 210 while the conditionally visible bite line 210 is rendered observable by the at least one light source 370 or 390, as appropriate, at least one camera may capture an image of the lasted upper 110 and, more particularly, the intersection 315 between the reflected portion 374 of light 372 and the conditionally visible bite line 210. As illustrated in FIG. 3A, the at least one camera comprises a first camera 380 and a second camera 382, and optionally may comprise additional cameras (not shown), to capture the intersection 315 of the conditionally visible bite line 210 and the reflected portion 374 of the projected light 372. The use of at least a first camera 380 and a second camera 382 may assist in accurately locating the intersection 315 of the conditionally visible bite line 210 and the reflected portion 374 of the projected light 372, particularly if the upper 110 is curved.

The use of multiple cameras is also contemplated to leverage stereopsis having two images from different perspectives. A binocular disparity between a first image from the camera 380 and a second image from the second camera 382 allows for a dimensional determination to be made for features captured in the contemporaneously captured images. This binocular depth perception allows a three-dimensional model to be generated of the lasted upper 110 as a series of binocular images from varied locations are captured. Stated differently, the location of a bite line may be identified in three-dimensional space by leveraging stereoscopic visual data from two cameras at a known distance from one another and then calculating a distance from the camera location to the bite line as intersected by a laser. The distance may be calculated based on a difference between the first camera's image and the second camera's image as they each capture a characteristic, such as the intersection 315 at a common time from different perspectives. This calculated distance information may be combined with captured positional information in the plane of the images to define the intersection 315 of the bite line and a laser in X, Y, and Z, coordinate space for generating the virtual bite line. Stated differently, the three-dimensional position of the intersection 315 is determined from the two-dimensional image captured from each of the cameras 380 and 382. It is contemplated that the determination of a relative location of points forming a virtual bite line is performed by a computing system having a processor and computer readable media having instructions embodied thereon for performing a method to determine the digital bite line from the captured images.

Further, image matching may be performed from successively captured stereo images to piece together, with the aid of a computing system, a three-dimensional model of the lasted upper. The movement of the camera or the lasted upper relative to one another aids in capturing otherwise obscured portions, such that when the stereoscopic images are manipulated in a three-dimensional modeling program, a three-dimensional digital bite line may be generated that represents the conditionally visible bite line of the lasted upper as captured by the one or more cameras.

The system of FIG. 3A leverages the light 390, which may be a UV light, to cause, in an exemplary aspect, a conditionally visibly bit line to be perceptible to the cameras 380 and 382. In this example, the cameras 380 and 382 may further be fitted with a filter, such as a longpass filter that attenuates (optically interferes) with shorter wavelengths of light while transmitting (allowing to pass through) longer wavelengths of a light spectrum. Additionally it is contemplated that a shortpass or a bandpass filter may alternatively or additionally be utilized to facilitate or to enhance the ability of a camera to perceive the conditionally visible bite line and/or the laser line as reflected from the lasted upper. For example, a filter may be affixed to the cameras 380, 382 to aid in capture of the conditionally visible bite line 210 when illuminated with a UV source, such as the light 390, in an exemplary aspect.

In addition to manipulating the light source and/or the image capture equipment (e.g., implementation of filters), it is contemplated that the conditionally visible marking material (e.g., ink) may also be adjusted to improve the effectiveness of generating a virtual bite line. For example, it is contemplated that materials used in the construction of the lasted upper may be responsive to a selected light source or an ambient light source. Stitching material or a strobel material may be responsive to UV or IR light, which may generate visual noise when exposed to an appropriate light intended to highlight the conditionally visible bite line. To reduce the impact of materials in the lasted upper construction that are also responsive to the ambient light or the light source light, the color of the conditionally visible marking materials may be adjusted away from commonly occurring material colors (e.g., white/blue), to a yellow or other color. In addition to changing the conditionally visible marking material, a coordinating filter may also be selected that further reduces visual noise, but still allows the conditionally visible bite line and the light source (e.g., laser) to be captured by the cameras. An example contemplated includes using a fluorescent yellow conditionally visible marking material that is responsive to UV light while also installing yellow filter on the cameras. An exemplary red laser has enough intensity to still be captured even with the yellow filters while obscuring visual noise from naturally occurring materials of the lasted upper, in an exemplary aspect. Additionally, it is contemplated that a chamber or a substantially enclosed space may be used to isolate the lasted upper, camera, and light sources may be isolated from ambient light of the environment in which the system is located. This isolation may be effective for increasing the contrast between the conditionally visible bite line and the lasted upper as perceived by one or more cameras.

As more fully described below, the intersection of the reflected light 374 and the conditionally visible bite line 210 may be used to create a virtual bite line (i.e., a digital bite line) that aids in identifying the portion of the surface of the lasted upper 110 within the first area 214 that includes a bottom portion 215 of the lasted upper 110 that is to be treated, for instance, by cementing, priming, cleaning, painting, buffing, and the like.

Figure 3B:
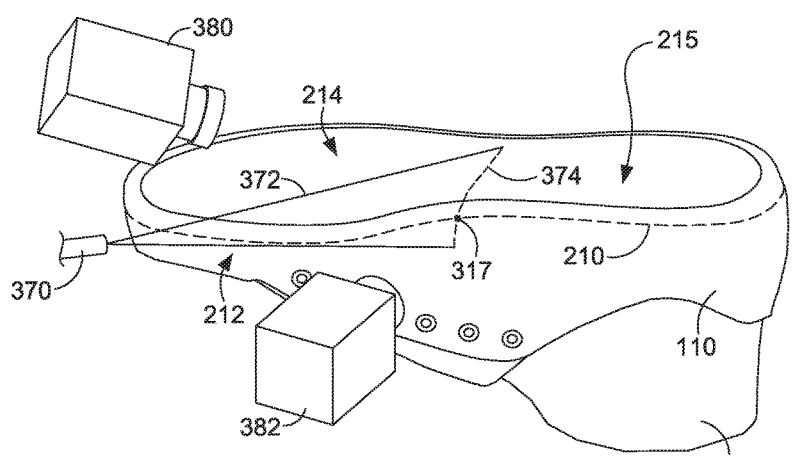
FIG. 3B is a schematic diagram illustrating the creation of a virtual bite line in association with an infrared conditionally visible demarcation in accordance with an aspect hereof.

FIG. 3B is a schematic diagram illustrating the creation of a virtual bite line in association with an infrared conditionally visible demarcation in accordance with an aspect hereof. FIG. 3B is similar to the previously discussed FIG. 3A; however, an optional light 390 is not used. Instead, the bite line 210 may be created with a conditionally visible marking material that is perceptible when exposed to a particular light source, such as an infrared laser. Because the bite line 210 is only perceptible by the cameras 380 and 382 when exposed to the light source 370, instead of a cross identifying the intersection of the light source and the bite line as depicted in FIG. 3A as a cross-like intersection 315, a point of intersection 317 is instead depicted. As previously provided, it is this intersection 317 that may be used by a computing system to match an image from the first camera 380 with an image from the second camera 382 to form a stereoscopic image pair for determining depth/distance of the intersection 317. A series of the determined three-dimensional intersections may be combined to generate the virtual bite line.

It is contemplated that the at least one camera 380, 382, light source 370, and any additional components, such as light source 390, may be coupled with a maintaining mechanism functional for maintain one or more of the components statically relative to one another. Further, the maintaining mechanism may be moveably adapted to move one or more components relative to the lasted upper 110. For example, it is contemplated that the maintaining mechanism is comprised of a rotational member effective for rotating the one or more components around a perimeter of the lasted upper 110. Further, it is contemplated that the maintaining mechanisms is comprised of a linear member effective for linear movement of the one or more components. A combination of the rotational member and the linear member may work in combination to allow for an elliptical motion path for the components to capture the conditionally visible bite line. In the alternative, it is contemplated that the maintaining mechanism may be comprised of orthogonally oriented movement member to allow the components to move in a first and an orthogonal second direction to achieve a linear motion path. The maintaining mechanisms may further be comprised of a rotational member coupled to the orthogonally oriented movement member to redirect the FOV of one or more components coupled therewith.

Figure 4:
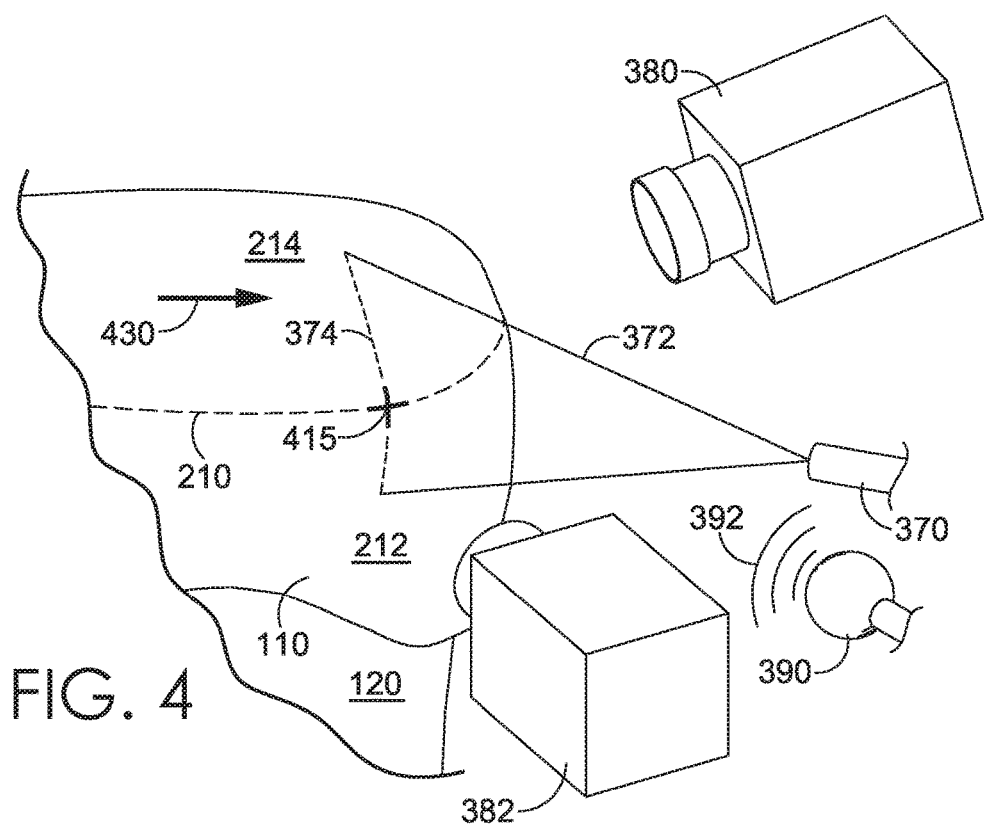
FIG. 4 is a schematic diagram illustrating a further example of the creation of a virtual bite line in accordance with an aspect hereof.

Referring now to FIG. 4, one example of the capturing of a plurality of intersections between the reflected portion 374 of a projected light 372 and a conditionally visible bite line 210 is illustrated. In the example of FIG. 4, a reflected portion 374 of the projected light 372 is reflected by the surface of the marked lasted upper 110 in at least the first area 214 and a portion of the second area 212. Because the conditionally visible bite line 210 has been rendered detectable, the intersection 415 between the reflected portion 374 of the light 372 and the conditionally visible bite line 210 may be captured by at least one camera (first camera 380 and second camera 382, as illustrated).

The lasted upper 110 and/or the light source 370 and/or 390, as appropriate, may be moved relative to one another as indicated by arrow 430 to cause the projected light 372 to substantially pass over the entirety of the conditionally visible bite line 210 while the at least one camera 380, 382 sequentially captures the points of intersection, such as intersection point 415, along the substantial entirety of the conditionally visible bite line 210. While a supplemental light source 390 is depicted, the supplemental light source 390 may be omitted in an exemplary aspect, such as when the conditionally visible bite line 210 is demarcated with an IR reactive marking agent. By capturing a plurality of points at which the reflected portion 374 of projected light 372 intersects with the conditionally visible bite line 210, the at least one camera 380, 382 may provide to a computing system (not shown) information permitting the creation of a virtual bite line representing and corresponding to the location of the conditionally visible bite line 210 on the lasted shoe upper 110. The thus-created virtual bite line may be used, at least in part, to generate a tool path for the treatment of the first area 214 of the surface of the lasted shoe upper 110 bounded by the conditionally visible bite line 210.

The direction of relative movement as indicated by arrow 430 contemplated the lasted upper 110 moving in a substantially linear relationship to the at least one camera 380, 382. For example, the at least one camera 380, 382 is moved in a linear path along a medial side and then in a linear path along a lateral side of the lasted upper 110. The at least one camera 380, 382 may transition from the linear path along the medial side to the path along the lateral side by crossing along in front of a toe portion and a heel portion. This linear movement may advantageously adapt to any size of shoe as a relatively consistent distance is maintained between the at least one camera 380, 382 and the sides of the lasted upper 110. However, depending on how the transition is performed at the toe end and the heel end, the size of the lasted upper may cause one or more portions to exceed a depth of field (to be discussed hereinafter) of the at least one camera 380, 382. It is also contemplated that the transition along the toe end and the heel end may be adjusted to maintain the at least one camera 380, 382 and the lasted upper 110, regardless of size, within the depth of field of the at least one camera 380, 382.

Figure 5A:
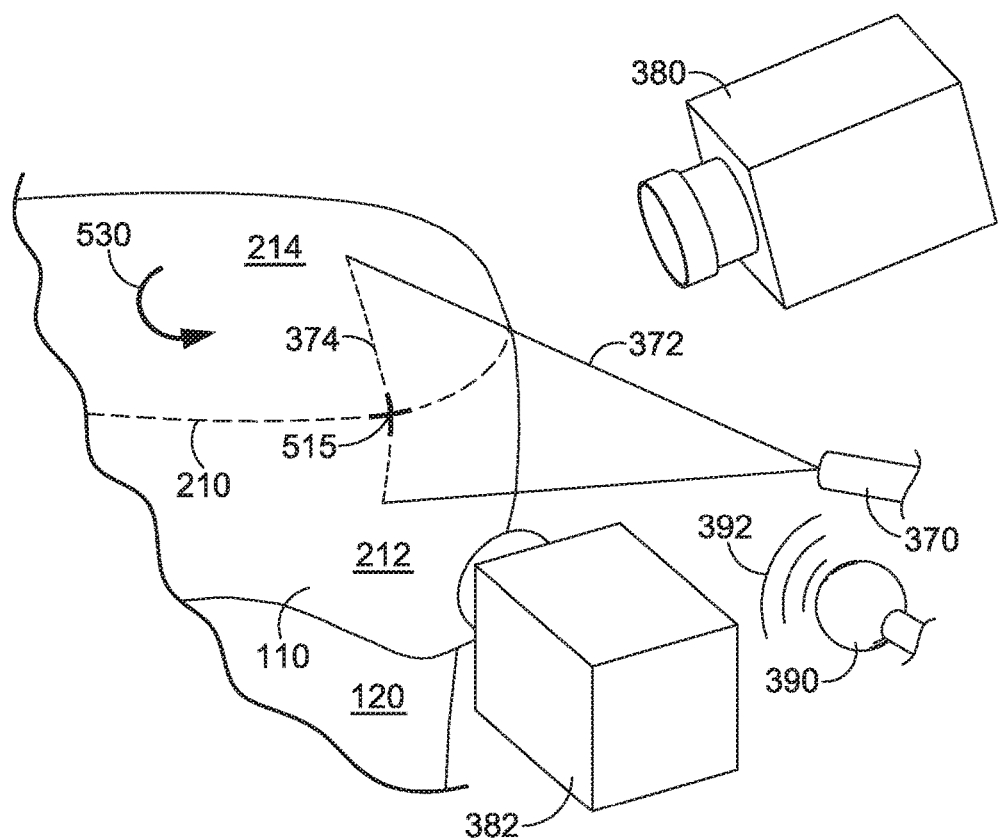
FIG. 5A is a schematic diagram illustrating a further example of the creation of a virtual bite line in accordance with an aspect hereof.

Referring now to FIG. 5A, another example of using a light source 370 that projects a light 372 such that at least a portion 374 of the projected light 372 reflects from at least the first area 214 of the surface of a lasted upper 110 is illustrated. In the example of FIG. 5A, as with the example of FIG. 4, at least one camera (first camera 380 and second camera 382, as illustrated) may capture images of the surface of the lasted upper 110 under conditions that render the conditionally visible bite line 210 detectable, such as when a fluorescent bite line has been illuminated using a black light (such as the supplemental light 390) or an IR bite line has been illuminated by an IR light source. As provided before, it is contemplated that the supplemental light source 390 may be omitted or not energized in an exemplary aspect. The at least one camera 380, 382 may at least capture points of intersection between the reflected portion 374 of the light 372 and the conditionally visible bite line 210. In the example shown in FIG. 5A, the reflected portion 374 of the light 372 intersects the conditionally visible bite line 210 at a first point 515. As indicated by arrow 530, the lasted shoe upper 110 and/or the light source 370, the at least one camera 380, 382 and the other light source 390 may be rotated relative to one another such that the reflected portion 374 of the light 372 may intersect with the conditionally visible bite line 210 substantially along the entirety of the conditionally visible bite line 210 while the at least one camera 380, 382 captures a plurality of images at least denoting the location of the points of intersection, such as intersection 515, for use in conjunction with a computing system (not shown) to generate a virtual bite line representing and corresponding to the conditionally visible bite line 210 on the shoe upper 110.

The relative rotational movement of the at least one cameras 380, 382 and the lasted upper 110 may also include an elliptical rotation, as will be described in greater detail hereinafter at FIG. 5B. For example, because a typical article of footwear is longer than it is wide (e.g., toe-to-heel length is greater than the medial-to-lateral width), if a constant radius of rotation with a focal point in the middle of the lasted upper was used, the cameras would be closer to the toe end and the heel end than they would be to the medial side and the lateral sides. This discrepancy in distance between the cameras and the target object may exceed the depth of field (DOF) for the cameras. For example, the range at which an object can be maintained in sufficient focus for a camera may be limited; therefore, either the close range of the toe/heel region may be in focus or the far range of the medial/lateral sides may be in focus while the other is not for a given DOF for the cameras. To reduce the potential discrepancy in DOF from the cameras between the toe/heel and the medial/lateral portions, it is contemplated that an elliptical rotation may be used (e.g., the cameras and light source may elliptically rotate about the lasted upper). The elliptical rotation is defined with the major axis in alignment with a toe-to-heel direction of the lasted upper and the minor axis is in alignment with the medial-to-lateral direction of the lasted upper. The elliptical (or any oval-like pattern) may be utilized to effectively scale the bite line detection mechanism across a variety of lasted upper sizes and shapes (e.g., foot sizes).

FIG. 5B depicts a side perspective of the lasted upper 110 relative to an exemplary elliptical motion path 362 of the light source 370 and the at least one camera 380, 382, in accordance with aspects hereof. As depicted the at least one camera 380, 382 may be affixed with a cross member 368 that is moveably coupled with a rotating member 366. As such, the rotating member 366 is functional to rotate about a point 364 and the movement of the cross member 368 along the linear axis of the rotating member 366 allows for a variable distance between the at least one camera 380, 382 and the point 364. This rotatably variable distance (e.g., radius) allows for an elliptical motion path to be achieved by at least one camera 380, 382 about the lasted upper 110. In an alternative aspect, it is contemplated that the lasted upper 110 may be rotated, such as on a rotating table portion, while the cross member or another radius variable structure adjusts the offset of the at least one camera 380, 382 from the lasted upper and/or the point 364 representing the point of rotation by the lasted upper 110.

Figure 5C:
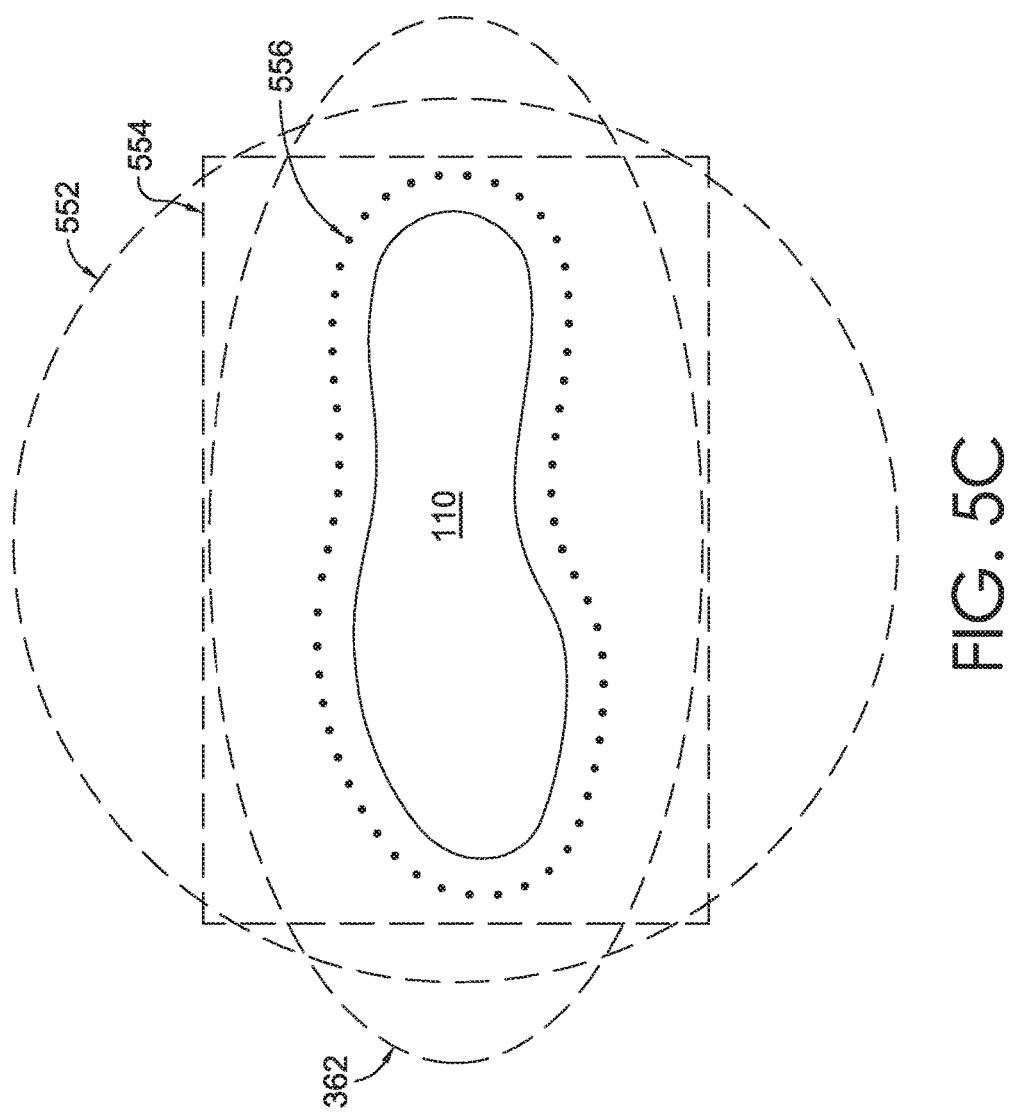
FIG. 5C is a schematic diagram illustrating a top view of a lasted upper relative to exemplary motion paths on which at least one camera may travel to capture a conditionally visible bite line, in accordance with aspects hereof.

FIG. 5C depicts a top view of the lasted upper 110 relative to exemplary motion paths on which at least one camera 380, 382 may travel to capture a conditionally visible bite line, in accordance with aspects hereof. For example, it is contemplated that in addition to, or in the alternative to, the elliptical path 362 discussed in FIG. 5B, the motion path may follow a circular path 552, a rectangular path (or series of linear paths) 554, or an edge offset path 556. The circular path may be accomplished by having the at least one camera 380, 382 positioned a fixed distance from a rotation point of either the lasted upper 110 or the structure to which the at least one camera 380, 382 are affixed. The rectangular path 554 may be formed by a series of linear motions that are fixed or adjusted based on the dimensions of the lasted upper 110. The edge offset 556 path may be accomplished by the at least one camera 380, 382 or an alternative spatial recognition system (e.g., another camera or known positional coordinates) determining a position of the lasted upper 110 relative to the at least one camera 380, 382 and then maintaining a relatively consistent distance between the at least one camera 380, 382 and the edges of the lasted upper 110. The different path options provide varied levels of control over DOF, FOV, cycle time, and complexity in implementing.

Figure 6A:
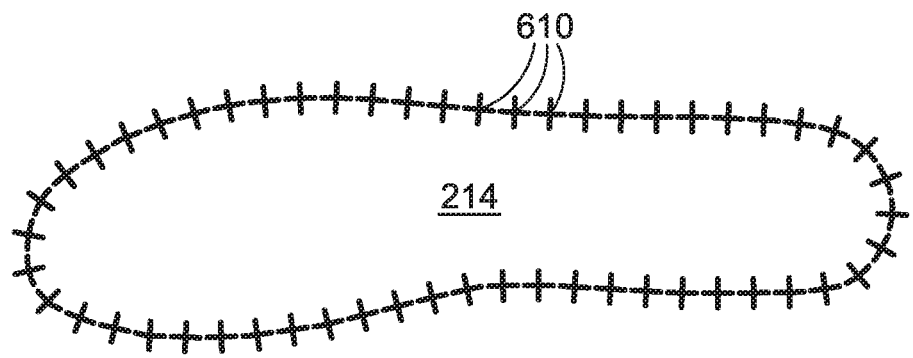
FIG. 6A is a schematic diagram illustrating the appearance of a plurality of intersection points as they would appear if a conditionally visible bite line was demarcated utilizing a fluorescent marking agent and the points of intersection were rendered detectable utilizing a UV light source, in accordance with an exemplary aspect hereof.
Figure 6B:
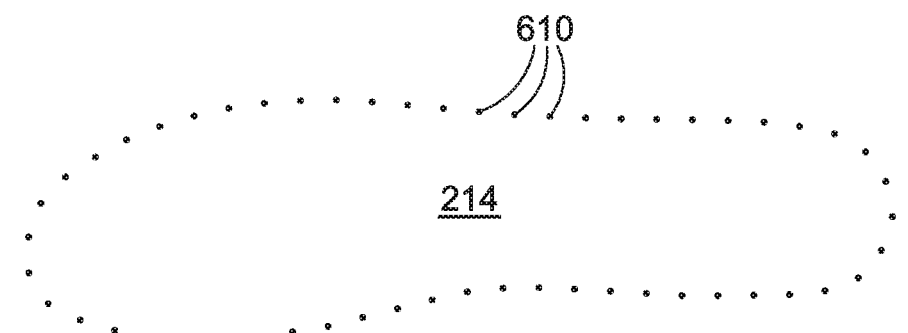
FIG. 6B is a schematic diagram illustrating the appearance of a plurality of intersection points as they would appear if a conditionally visible bite line was demarcated utilizing an IR marking agent and the points of intersection were rendered detectable utilizing an IR light source, in accordance with an exemplary aspect hereof.

Referring now to FIGS. 6A and 6B, examples of a plurality of intersection points 610 between a projected light 372 and a conditionally visible bite line 210 are shown. FIG. 6A illustrates the appearance of a plurality of intersection points 610 as they would appear if a conditionally visible bite line 210 was demarcated utilizing a fluorescent marking agent and the points of intersection were rendered detectable utilizing a UV light source, such as a black light. As can be seen in FIG. 6A, a plurality of intersections 610 that are cross-like between a conditionally visible bite line 210 and the reflected portion 374 of a projected light 372, in the presence of another light source 390, may be recorded using at least one camera 380, 382 to capture images while the conditionally visible bite line 210 has been rendered detectable by light 392 from the other light source 390. As previously discussed, it is contemplated that the intersections 610 may be used by a computing system to match concurrently captured images from two different cameras for a three-dimensional understanding of the location for the intersection 610, which is then used to form a virtual bite line.

FIG. 6B illustrates the appearance of a plurality of intersection points 610 as they would appear if a conditionally visible bite line 210 was demarcated utilizing an IR marking agent and the points of intersection were rendered detectable utilizing an IR light source. As can be seen in FIG. 6B, a plurality of intersections 610 that are dot-like in appearance between a conditionally visible bite line 210 and the reflected portion 374 of a projected light 372, may be recorded using at least one camera 380, 382 to capture images while the conditionally visible bite line 210 is rendered visible by the projected light 372.

The precise number of intersections 610 captured by the at least one camera 380, 382 for any particular application of systems and methods in accordance herewith may vary, based upon considerations such as the degree of precision required in the creation of a virtual bite line to define the boundary of an area such as first area 214 for the generation of a tool path contained within the first area 214. In accordance with aspects hereof, a computing system may generate a series of line segments and/or curves connecting the detected intersections of the projected light source and the conditionally visible bite line to generate the virtual bite line.

Figure 7:
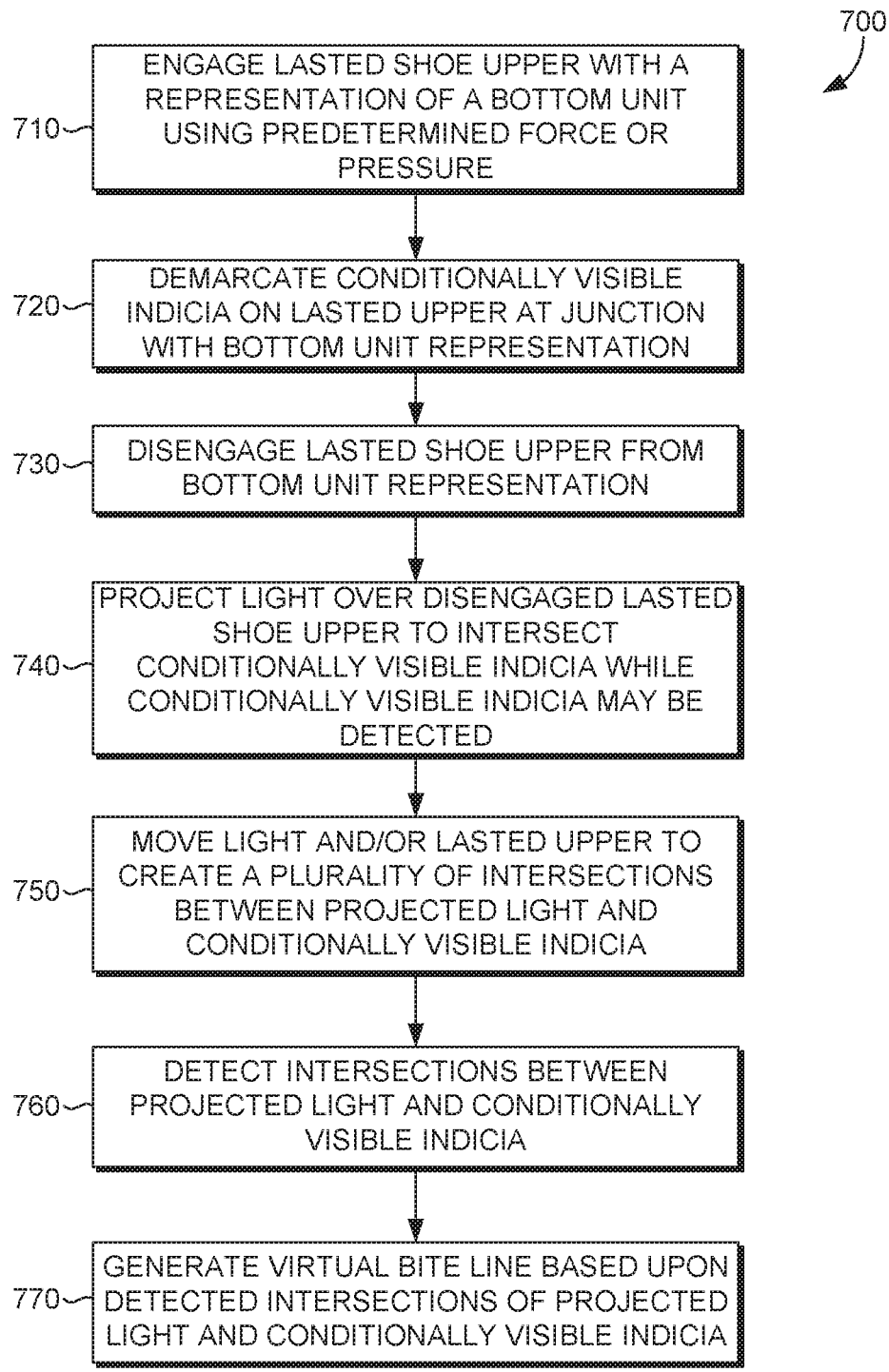
FIG. 7 is a flow diagram illustrating an example of a method for generating a virtual bite line using a conditionally visible bite line in accordance with an aspect hereof.

Referring now to FIG. 7, a method 700 for marking a conditionally visible bite line for use in generating a virtual bite line for a lasted shoe upper is illustrated. In step 710, a lasted shoe upper may be engaged with a corresponding bottom. A predetermined force or pressure used to engage a lasted shoe upper with a representation of a corresponding bottom unit in step 710 may be the same force or pressure intended to be subsequently used in the bonding of the shoe upper to the corresponding bottom unit using an adhesive, but these forces may vary. In step 720, conditionally visible indicia may be demarcated on the lasted upper at the junction between the lasted upper and the bottom unit. Step 720 may use, for example, a marking mechanism that applies a fluorescent marking agent or an IR marking agent at the junction between the lasted upper and the corresponding bottom unit to create conditionally visible indicia at the bite line. In step 730, the lasted shoe upper may be disengaged from the corresponding bottom unit. In step 740, a light may be projected over the disengaged lasted shoe upper to intersect the conditionally visible indicia while the conditionally visible indicia may be detected. For example, step 740 may utilize a black light, an IR light, or other illumination source that permits the conditionally visible indicia created in step 720 to be perceived by a human eye and/or camera(s) capturing images of the shoe upper. In step 750, the light source(s), camera(s), and/or the lasted upper may be moved relative to one another to create a plurality of intersections between one of the projected light sources and the conditionally visible indicia. Step 750 may rotate the camera(s) and/or lighting source(s) around the shoe upper, for example, or alternatively/additionally the shoe upper may be rotated. Step 750 may occur under conditions that permit the conditionally visible indicia to be detected. In step 760 the intersections between the projected light source and the conditionally visible indicia created in steps 740 and 750 may be detected. Step 760 may utilize a camera(s) operating in conjunction with a computing system to capture the physical location of the intersections between the projected light source and the conditionally visible indicia. In step 770, a virtual bite line may be generated using the detected intersections of the projected light source and the conditionally visible indicia. For example, a computing system may generate a series of line segments and/or curves connecting the detected intersections of the projected light source and the conditionally visible bite line. Such a virtual bite line as generated in step 770 may subsequently be used for further processing of the shoe upper. For example, the virtual bite line created in step 770 may be used to establish the limits of the application of a spray adhesive, to define the extent of subsequent scanning of the surface of the shoe upper, or to establish other processing applications and/or tool paths.

Figure 8:
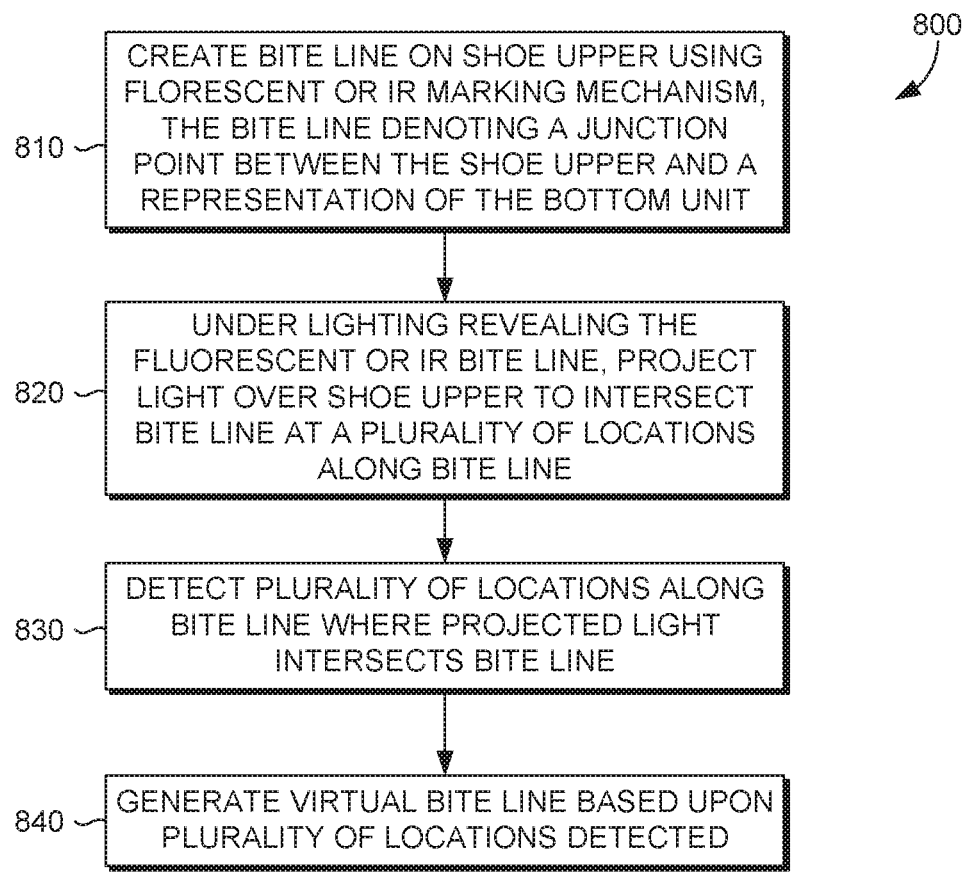
FIG. 8 is a flow diagram illustrating an example of a method for creating a virtual bite line using a conditionally visible bite line in accordance with an aspect hereof.

Referring now to FIG. 8, a further example of a method 800 in accordance with the present invention is illustrated. Method 800 may generate a fluorescent or IR bite line on the surface of a shoe upper corresponding to the junction of the shoe upper and a corresponding bottom unit, such that the fluorescent or IR bite line may only be observable under certain circumstances, such as when illuminated using a black light or IR light source, as appropriate. The method 800 may begin at step 810 with the creation of a bite line on the shoe upper using a fluorescent or IR marking mechanism, the bite line denoting the junction point between the shoe upper and a representation of a corresponding bottom unit. Step 810 may be performed when the shoe upper has been mated with a corresponding bottom unit with a predetermined amount of force and pressure that may optionally correspond to the amount of force or pressure to be used during a subsequent bonding step. In step 820, under lighting conditions revealing the fluorescent or IR bite line, a light may be projected over a portion of the shoe upper so as to intersect the bite line at a plurality of locations along the bite line. Step 820 may involve, for example, moving the shoe upper, the light source, and/or any cameras in a linear and/or rotational fashion to create intersections between the projected light and the perceivable fluorescent or IR bite line along the length of the bite line created to bound the surface to be covered by the shoe bottom unit upon assembly. In step 830, the plurality of locations along the bite line where the projected light intersects the bite line may be detected. Step 830 may use one or more cameras, which may be operating in conjunction with a computing system. In step 840 a virtual bite line may be generated based upon the plurality of locations detected in step 830. Step 840 may comprise generating a plurality of line segments and/or curves joining the plurality of intersections detected in step 830. The number of intersections detected in step 830 may vary based upon the complexity of the shoe upper and/or corresponding bottom unit (or representation thereof), the precision required for the subsequent generation of a tool path, or any other considerations.

While systems and methods in accordance herewith have been described in specific examples herein, the present invention is not limited to these examples. For example, more or fewer components (such as cameras, lighting sources, etc.) may be used without departing from the scope of the present invention. For example, multiple camera(s) may detect multiple intersections between a projected light and a conditionally visible bite line simultaneously in order to facilitate the efficient generation of a virtual bite line in accordance with the present invention. Further, conditionally visible materials other than fluorescent and IR materials may be used to create a conditionally visible bite line. For example, any material that reflects light at wavelengths not observable using the human eye but that may be detected using special lighting conditions and/or camera(s) in accordance with the present invention may be used to create a conditionally visible bite line.

What is claimed is:

1. A system for creating a virtual bite line in connection with an article of footwear, the system comprising:
    a marking mechanism that applies conditionally visible indicia to a surface of a shoe upper at an interface of the shoe upper and a bottom unit when the shoe upper and the bottom unit are temporarily joined;
    a first light source that projects a structured light pattern across at least a portion of the marked shoe upper when the bottom unit is removed from the shoe upper, the projected structured light intersecting the conditionally visible indicia at at least one point to create an illuminated intersection point; and
    at least one camera that detects the illuminated intersection point between the projected light and the conditionally visible indicia.

2. The system of claim 1, wherein the first light source renders the conditionally visible indicia detectable by the at least one camera.

3. The system of claim 2, wherein the marking mechanism applies the conditionally visible indicia utilizing a marking agent that is responsive to the Infrared light spectrum, and wherein the first light source is an Infrared light source.

4. The system of claim 1, further comprising a second light source that renders the conditionally visible indicia detectable by the at least one camera.

5. The system of claim 4, wherein the marking mechanism applies the conditionally visible indicia utilizing a marking agent that is responsive to the Ultraviolet light spectrum, and wherein the second light source is an Ultraviolet light source.

6. The system of claim 1, further comprising a movement mechanism that moves at least one of the marked shoe upper, the first light source, and the at least one camera to sequentially create a plurality of illuminated intersection points between the projected light and the conditionally visible indicia, each of the plurality of intersections being detected by the at least one camera.

7. The system of claim 6, further comprising a computing system that receives data representing the plurality of illuminated intersection points detected by the at least one camera and generates the virtual bite line based upon the data.

8. The system of claim 7, wherein the virtual bite line generated by the computing system comprises a plurality of line segments and/or curves connecting the plurality of illuminated intersection points.

9. A system for creating a virtual bite line in connection with an article of footwear, the system comprising:
    a press that engages a shoe upper with a shoe bottom unit;
    a marking mechanism that applies conditionally visible indicia to a surface of the shoe upper as the shoe upper is engaged with the shoe bottom unit;
    at least a first light source that that projects a structure light pattern onto the surface of the shoe upper when the shoe bottom is disengaged from the shoe upper, the projected structured light pattern intersecting the conditionally visible indicia at a plurality of intersection points;
    at least one camera that detects the plurality of intersection points between the conditionally visible indicia and the projected light; and
    a computing system that operably connects to the at least one camera to receive data representing the plurality of intersection points between the conditionally visible indicia and the projected light and generate the virtual bite line based on the received data.

10. The system of claim 9, further comprising a second light source that renders the conditionally visible indicia detectable by the at least one camera.

11. The system of claim 10, wherein the marking mechanism applies the conditionally visible indicia utilizing a marking agent that is responsive to the Ultraviolet light spectrum, and wherein the second light source is an Ultraviolet light source.

12. The system of claim 9, wherein the first light source renders the conditionally visible indicia detectable by the at least one camera.

13. The system of claim 12, wherein the conditionally visible indicia are applied utilizing a marking agent that is responsive to the Infrared light spectrum, and wherein the first light source is an Infrared light source.

14. The system of claim 9, further comprising a movement device that changes the relative position of at least the shoe upper and the first light source to sequentially create the plurality of intersection points between the conditionally visible indicia and the projected light.

15. The system of claim 9, wherein the computing system generates the virtual bite line using a plurality of curves and/or line segments to connect the plurality of intersection points between the conditionally visible indicia and the projected light.

16. A method for processing a shoe upper, the method comprising:
    lasting the shoe upper;
    engaging the lasted shoe upper with a shoe bottom unit;
    while the lasted shoe upper is engaged with the shoe bottom, demarcating, on the lasted shoe upper, a conditionally visible bite line at the intersection between the lasted shoe upper and the shoe bottom unit, the conditionally visible bite line being detectable only under predetermined lighting conditions;

disengaging the lasted shoe upper from the shoe bottom unit;

projecting light in a structured pattern from a first light source over at least a portion of a surface of the lasted shoe upper when the shoe bottom unit is disengaged from the lasted shoe upper, the structured pattern of light intersecting the conditionally visible indicia at least one point to create an intersection point;

moving at least one of the lasted shoe upper and the light source relative to the other of the lasted shoe upper and the light source to sequentially create a plurality of intersection points between a portion of the light reflected from the surface of the lasted shoe upper and the conditionally visible bite line; and detecting the plurality of intersection points between the portion of the light reflected from the surface of the lasted shoe upper and the conditionally visible bite line using at least one camera.

17. The method of claim 16, further comprising:

receiving data representing the plurality of intersection points between the portion of the light reflected from the surface of the lasted shoe upper and the conditionally visible bite line from the at least one camera in a computing system; and generating, in the computing system, a virtual bite line that connects the plurality of intersection points between the portion of the light reflected from the surface of the lasted shoe upper and the conditionally visible bite line.

18. The method of claim 16, wherein the first light source renders the conditionally visible indicia detectable by the at least one camera.

19. The method of claim 18, wherein the conditionally visible indicia are applied utilizing a marking agent that is responsive to the Infrared light spectrum, and wherein the first light source is an Infrared light source.

20. The method of claim 16, further comprising a second light source that renders the conditionally visible indicia detectable by the at least one camera, wherein the conditionally visible indicia are applied utilizing a marking agent that is responsive to the Ultraviolet light spectrum, and wherein the second light source is an Ultraviolet light source.

* * * * *

UNITED STATES PATENT AND TRADEMARK OFFICE
CERTIFICATE OF CORRECTION

| | | |
|---|---|---|
| PATENT NO. | : 9,668,545 B2 | |
| APPLICATION NO. | : 14/988399 | |
| DATED | : June 6, 2017 | |
| INVENTOR(S) | : Dragan Jurkovic et al. | |

It is certified that error appears in the above-identified patent and that said Letters Patent is hereby corrected as shown below:

In the Claims

Column 16, Line 21: Please remove the word "that" which is repeated.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*